United States Patent
Hsu

(10) Patent No.: US 10,680,473 B2
(45) Date of Patent: Jun. 9, 2020

(54) ELECTRIC MOTOR ROTOR MECHANISM

(71) Applicant: INDUSTRIAL TECHNOLOGY RESEARCH INSTITUTE, Hsinchu (TW)

(72) Inventor: Ming-Mao Hsu, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 413 days.

(21) Appl. No.: 15/388,842

(22) Filed: Dec. 22, 2016

(65) Prior Publication Data

US 2018/0026485 A1  Jan. 25, 2018

Related U.S. Application Data

(60) Provisional application No. 62/365,882, filed on Jul. 22, 2016.

(30) Foreign Application Priority Data

Nov. 21, 2016  (TW) ............................. 105138154 A

(51) Int. Cl.
*H02K 1/22* (2006.01)
*H02K 19/14* (2006.01)
*H02K 19/02* (2006.01)

(52) U.S. Cl.
CPC ............... *H02K 1/22* (2013.01); *H02K 19/02* (2013.01); *H02K 19/14* (2013.01)

(58) Field of Classification Search
CPC ........... H02K 1/22; H02K 19/14; H02K 19/02

USPC ................. 310/156.78–156.84, 211, 212, 40
See application file for complete search history.

(56) References Cited

U.S. PATENT DOCUMENTS

| 5,501,671 A * | 3/1996 | Rosen ............... A61M 25/0693 604/168.01 |
| 5,831,367 A | 11/1998 | Fei et al. |
| 7,741,750 B1 | 6/2010 | Tang |
| 9,263,920 B2 * | 2/2016 | Kwok ..................... H02K 1/30 |
| 2001/0042980 A1 * | 11/2001 | Sollars, Jr. ............ B60R 21/235 280/743.1 |

(Continued)

FOREIGN PATENT DOCUMENTS

| CN | 1607712 A | 4/2005 |
| CN | 101630887 B | 2/2011 |

(Continued)

OTHER PUBLICATIONS

Translated version of JPH11146615 A (Year: 1999).*

(Continued)

*Primary Examiner* — Jue Zhang
*Assistant Examiner* — Htet Z Kyaw
(74) *Attorney, Agent, or Firm* — Maschoff Brennan

(57) ABSTRACT

An electric motor rotor mechanism includes a plurality of rotor bars and a rotor core. The rotor bars are disposed on the rotor core. The rotor core has a plurality of lines of barriers and a plurality of flux barrier holes. Each of the lines of barriers extends from one of the rotor bars to another one of the rotor bars. The flux barrier holes are arranged along the lines of barriers. Each of the flux barrier holes is a magnetic flux barrier. An area between each adjacent flux barrier hole is a magnetic flux path.

12 Claims, 7 Drawing Sheets

(56) References Cited

U.S. PATENT DOCUMENTS

| | | | |
|---|---|---|---|
| 2006/0284512 A1* | 12/2006 | Lee | H02K 1/246 310/216.008 |
| 2008/0136281 A1* | 6/2008 | Fujii | H02K 1/2766 310/156.08 |
| 2010/0148613 A1* | 6/2010 | Nam | H02K 19/14 310/156.83 |
| 2014/0246943 A1 | 9/2014 | Omekanda et al. | |
| 2014/0285050 A1 | 9/2014 | Melfi et al. | |
| 2015/0171674 A1 | 6/2015 | Lee et al. | |
| 2016/0056674 A1* | 2/2016 | Buettner | H02K 1/246 310/46 |
| 2018/0019626 A1* | 1/2018 | Tsai | H02K 1/246 |

FOREIGN PATENT DOCUMENTS

| | | | |
|---|---|---|---|
| CN | 101060261 B | 11/2011 | |
| CN | 102347675 A | 2/2012 | |
| JP | H11146615 A | 5/1999 | |
| JP | 2009247095 A | 10/2009 | |
| TW | I314380 B | 9/2009 | |
| TW | 201515365 A | 4/2015 | |
| TW | 203135666 U | 4/2015 | |
| TW | I504105 B | 10/2015 | |
| TW | I53888423 B | 12/2016 | |

OTHER PUBLICATIONS

Received STIC search report from EIC 2800 seacher Patel Samir on Nov. 20, 2018 (Year: 2018).*
TW Office Action dated Sep. 7, 2017 in appliction 105138154.
Design and Analysis of a Two-Speed Line Start Synchronous Motor: Scheme One, Aliakbar Damaki Aliabad, Fakhrossadat Ghoroghchian, IEEE Transactions on Energy Conversion, 2006, p. 366-372 (2006).
Identification of the broken bar fault in induction motors with rotor air ducts through the torque spectrum, Konstantinos N. Gyftlakis, Sang Bin Lee ; Joya Kappatou ; Jose A. Antonino-Daviu, 2014 International Conference on Electrical Machines, 2014 (2014).
Online Parameter Estimation of Permanent-Magnet Assisted Synchronous Reluctance Motor, Peyman Niazi, Hamid A. Toliyat, IEEE Transactions on Industry Applications, 2007, p. 609-615 (2007).
Rotor Design to Improve Starting Performance of the Line-start Synchronous Reluctance Motor, Tae-Uk Jung, Hyuk Nam, Journal of Electrical Engineering & Technology, 2006, p. 320-326 (2006).
Semianalytical Framework for Synchronous Reluctance Motor Analysis Including Finite Soft-Magnetic Material Permeability, R. L. J. Sprangers , J. J. H. Paulides ; B. L. J. Gysen ; J. Waarma ; E. A. Lomonova, IEEE Transactions on Magnetics, 2015 (2015).
Viability of Highly Efficient Multi-Horsepower Line-Start Permanent-Magnet Motors, Michael J. Melfi, Stephen D. Umans, Judith E. Atem, IEEE Transactions on Industry Applications, 2015, p. 120-128 (2015).
Chinese Office Action issued in corresponding application No. 201611242455.X, dated Jan. 25, 2019.
Chinese Office Action issued in corresponding application No. 201611242455.X, dated Jun. 26, 2019.

* cited by examiner

ELECTRIC MOTOR ROTOR MECHANISM

CROSS-REFERENCE TO RELATED APPLICATIONS

This non-provisional application claims priority under 35 U.S.C. § 119(a) on Patent Application No(s). 62/365,882 filed in United State on Jul. 22, 2016, and Patent Application No(s) 105138154 filed in Taiwan, R.O.C. on Nov. 21, 2016, the entire contents of which are hereby incorporated by reference.

TECHNICAL FIELD

The disclosure relates to an electric motor rotor mechanism, more particularly to an electric motor rotor mechanism simultaneously having the advantages of the synchronous motor and the asynchronous electric motors.

BACKGROUND

Electric motors can convert electrical energy into mechanical energy through electromagnetic interactions. The electric motors are widely used in daily life and applied to many fields. For example, the electric motors can be applied to machine tools, water pumps, light machineries, wind power systems, hydroelectric power generation systems and the like. The electric motors are fundamental machines in industry and closely linked with economic development.

In conventional electric motors, the motor performance can be improved by changing the material used in the electric motors, or adding more materials into the electric motors. For example, a synchronous electric motor is equipped with permanent magnets which are made of rare earth elements (REEs). However, since the energy saving issue is a matter of great concern for industries, the price of rare earth elements is getting higher, and related technologies are becoming more mature, the solution to reduce the usage of the rare earth elements as well as improve the motor performance has become one of the most important issues in the field of electric motor. As a result, a synchronous reluctant electric motor, without any rare-earth element permanent magnets, has become a new trend, but this type of motor has a disadvantage of requiring an actuator and a controller for operating smoothly.

Accordingly, an electric motor can become a very competitive electric motor if you simultaneously combine the high-performance feature of the synchronous reluctance electric motor, and the self-starting, high loading, high reliability features of the conventional asynchronous electric motor, which operates without the actuator, (a type of an induction motor).

SUMMARY

The present disclosure provides an electric motor rotor mechanism simultaneously having advantages of synchronous and asynchronous electric motors, so that the electric motor is favorable for reducing the size and the cost of the electric motor, achieving self-starting, increasing the flux density and the output torque, improving the motor performance, and having high loading.

One embodiment of the disclosure provides an electric motor rotor mechanism including a plurality of rotor bars and a rotor core. The rotor bars are disposed on the rotor core. The rotor core has a plurality of lines of barriers and a plurality of flux barrier holes. Each of the lines of barriers extends from one of the rotor bars to another one of the rotor bars. The flux barrier holes are arranged along the lines of barriers. Each of the flux barrier holes is a magnetic flux barrier. An area between each adjacent flux barrier hole is a magnetic flux path.

According to the electric motor rotor mechanism as discussed above, in a specific time of operation, since the rotor core has flux barrier holes arranged along the lines of barrier, the flux barrier holes become flux barriers for blocking the magnetic lines of force, so that the magnetic lines of force are crowded in a region surrounded by the lines of barrier, thereby increasing the flux density in the rotor and the torque of the electric motor, and improving the motor performance. Then, as time goes by, some of the magnetic lines of force can pass through the magnetic flux paths, each formed between the adjacent flux barrier holes, in order to maintain the operation of the electric motor, thereby reducing the torque Ripple.

In other words, by the arrangement of the flux barrier holes on the rotor core, the reluctance torque and the flux density are increased, and the operation is in progress, so that the electric motor is simple in structure, which is for favorable for being made smaller, and the flux density is increased to enhance the torque, thereby improving the motor performance. Thus, the electric motor of the present disclosure simultaneously has the advantages of the asynchronous and synchronous electric motors.

BRIEF DESCRIPTION OF THE DRAWINGS

The present disclosure will become better understood from the detailed description given hereinbelow and the accompanying drawings which are given by way of illustration only and thus are not limitative of the present disclosure and wherein.

DETAILED DESCRIPTION

Figure 1:
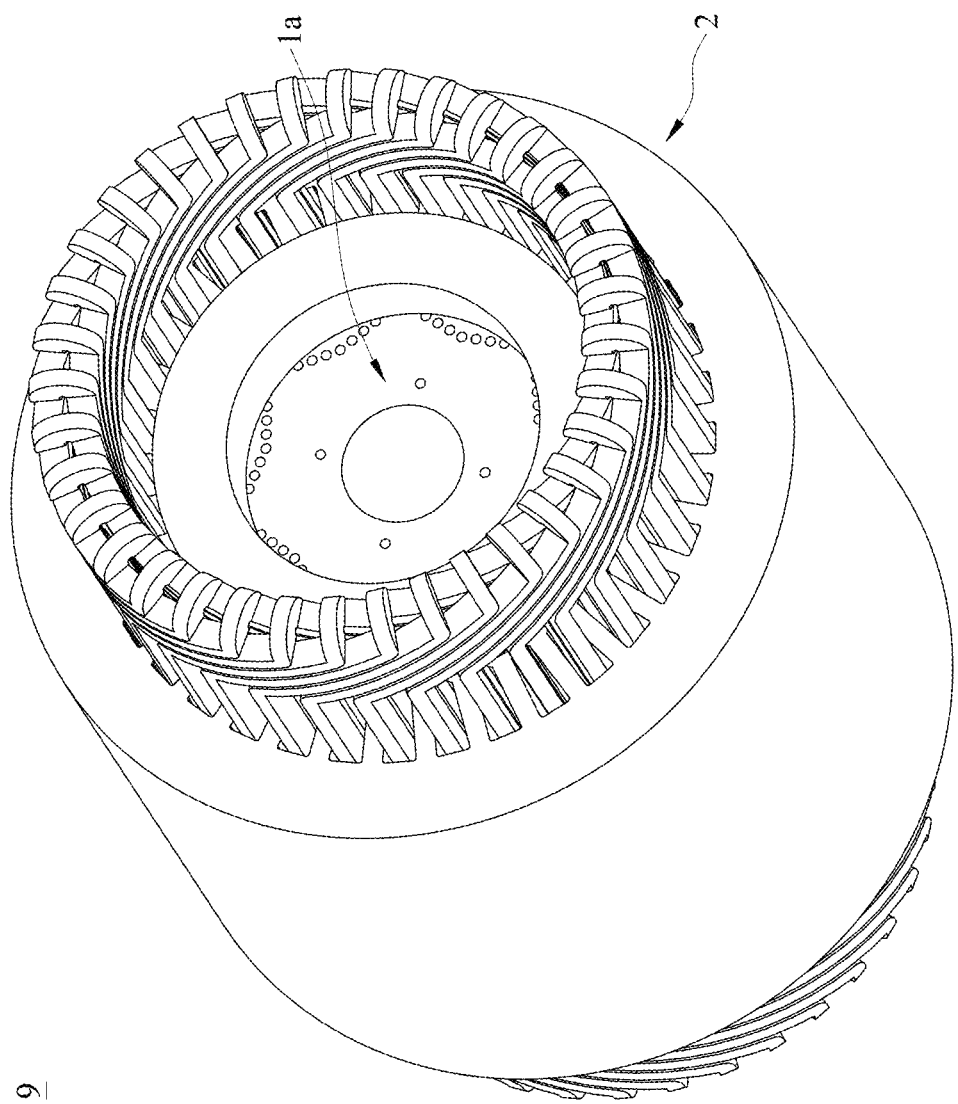
FIG. 1 is a perspective view of an electric motor according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
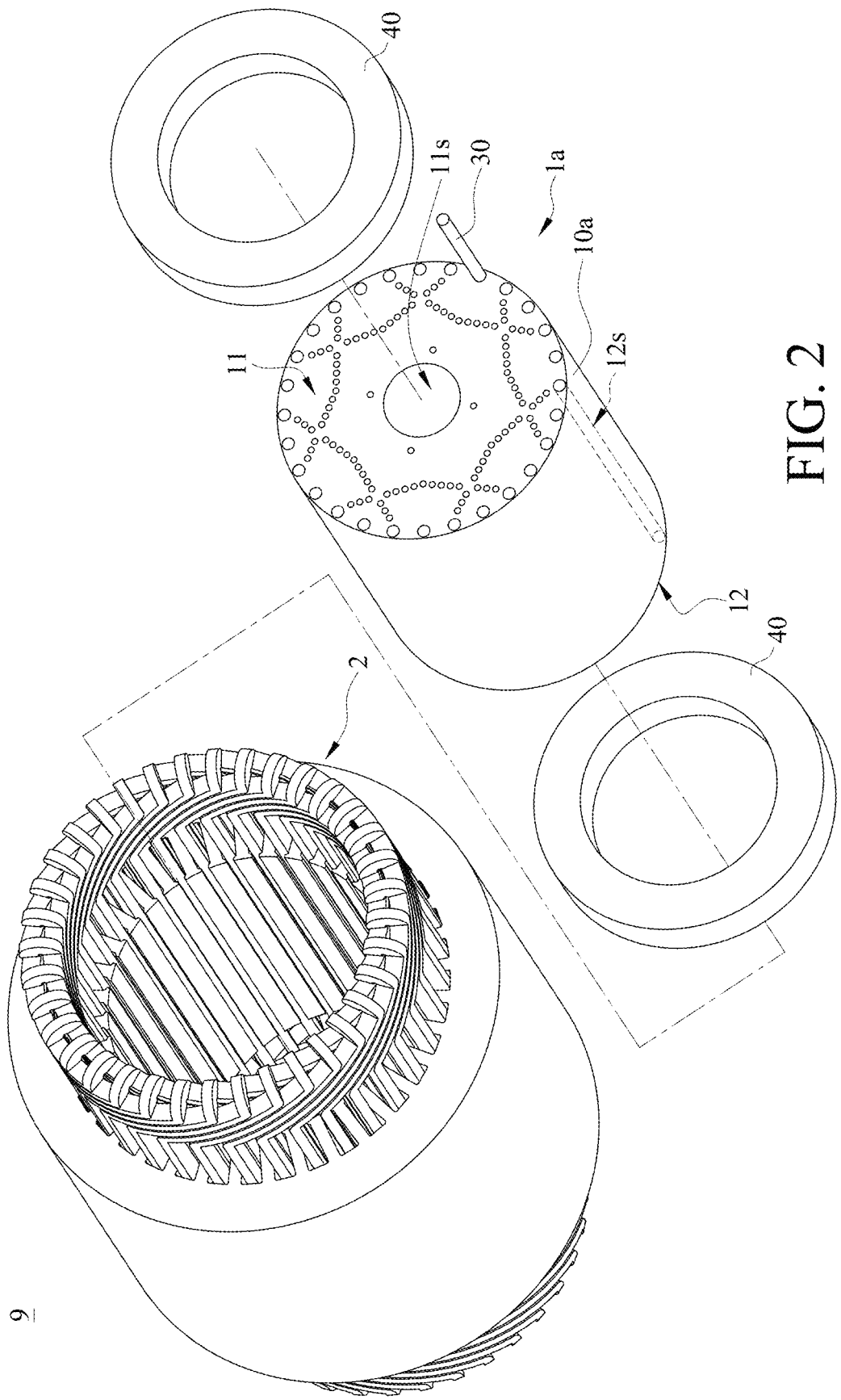
FIG. 2 is an exploded view of the electric motor in FIG. 1.

Please refer to FIGS. 1 to 2. FIG. 1 is a perspective view of an electric motor according to one embodiment of the disclosure, and FIG. 2 is an exploded view of the electric motor in FIG. 1.

In this embodiment, a rotor mechanism 1a is provided. The rotor mechanism 1a is adaptive to an electric motor 9. The electric motor 9 includes a stator 2 and two end rings 40.

The rotor mechanism 1a is rotatable located in the stator 2. The two end rings 40 are located at two surfaces 11 and 12 of the rotor mechanism 1a, which are opposite to each other, but the present disclosure is not limited to the stator 2, the end rings 40 or their configurations.

Then, the rotor mechanism 1a is illustrated in the following paragraphs. Please also refer to FIG. 3, which is a front view of the electric motor in FIG. 1. The rotor mechanism 1a includes a rotor core 10a and a plurality of rotor bars 30. The rotor core 10a is a structure formed by laminating silicone steel plates. In addition, the rotor core 10a may have skewed slots (not shown) in order to reduce motor noise and the starting current and increase the starting torque.

Furthermore, the rotor core 10a has an axle hole 11s and a plurality of rotor slots 12s. The axle hole 11s extends through the rotor core 10a and is located at a central axis of the rotor core 10a, for the insertion of a shaft for outputting the rotational driving force from the rotor mechanism 1a, but the central axis and the shaft are optional, the present disclosure is not limited thereto. In this or some embodiments, the axle hole 11s may be inserted with other workpieces for outputting the rotational driving force.

In this embodiment, the rotor slots 12s penetrate through the rotor core 10a, and the axle hole 11s is surrounded by the rotor slots 12s. The rotor slots 12s are located relatively close to a side surface of the rotor core 10a, and the rotor bars 30 are respectively disposed in the rotor slots 12s. However, the present disclosure is not limited to the locations of the rotor slots 12s. In some embodiments, the locations of the rotor slots 12s may be located relatively close to the axle hole 11s; that is, the locations of the rotor bars 30 are located relatively close to the axle hole 11s.

Then, in this or other embodiments, the rotor core 10a has a plurality of lines of barriers R1 and a plurality of flux barrier holes 13. For the purpose of illustration, there is only one line of barrier R1 illustrated in FIG. 3.

Figure 3:
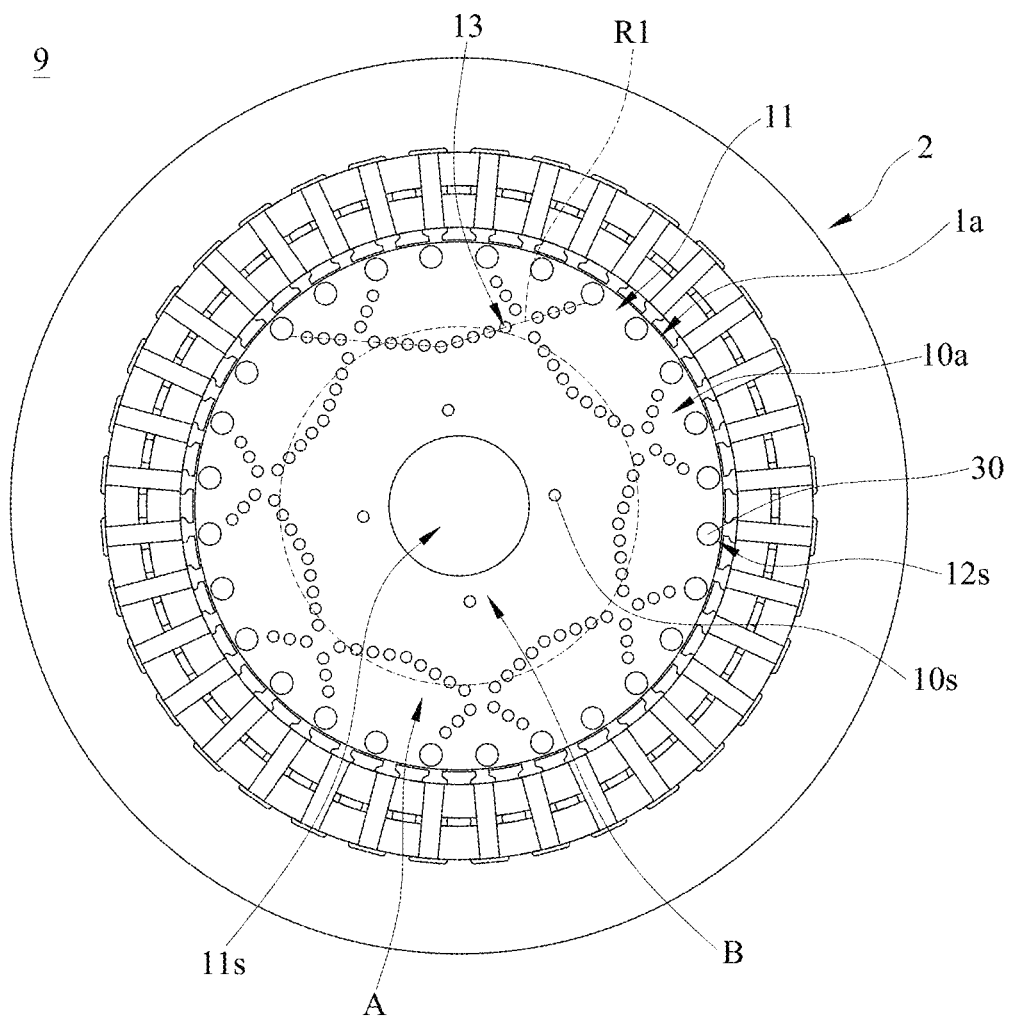
FIG. 3 is a front view of the electric motor in FIG. 1.

In detail, the lines of barrier R1 are located in the rotor yoke (not numbered), which is located between the rotor bar 30 and the axle hole 11s, and each line of barrier R1 extends from one of the rotor bars 30 to another rotor bar 30. That is, each line of barrier R1 passes through two different rotor bars 30 simultaneously, but the present disclosure is not limited to which two rotor bars that are connected to the ends of each line of barrier R1. In addition, in this or other embodiments, each line of barrier R1 crosses at least another two lines of barriers R1. As shown in FIG. 3, the rotor core 10a has seven lines of barriers R1 for the distribution of the magnetic lines of force.

In more detail, as shown in FIGS. 2 to 3, at least a part of each line of barrier R1 overlaps with an orthogonal projection A of one of the end rings 40 onto the surface 11 or 12 of the rotor core 10a.

The flux barrier holes 13 are arranged along the lines of barriers R1. The flux barrier holes 13 are separated from one another; that is, the flux barrier holes 13 are spaced apart. When the electric motor is in operation, each flux barrier holes 13 becomes a flux barrier which is able to block the magnetic lines of force. When a motor slip occurs, a magnetic flux path is formed between each adjacent flux barrier hole 13 for the magnetic lines of force to pass through. In addition, in this embodiment, the flux barrier holes 13 on each line of barriers R1 are spaced apart equally; that is, the distance between each flux barrier hole 13 is equal, but the present disclosure is not limited thereto. In some embodiments, the flux barrier holes 13 on each line of barriers R1 are not spaced apart equally; that is, on each line of barrier R1, the distance between each flux barrier hole 13 varies; or some of the flux barrier holes 13 are spaced apart equally, but the other are not.

In addition, in this or some embodiments, a cross section of each flux barrier hole 13 is in a circle, but the present disclosure is not limited thereto. In some embodiments, a cross section of each flux barrier hole may be in any shape, such as a circle, an ellipse or a polygon.

Furthermore, in this or some embodiments, according to actual requirements, a ratio of a distance between two of the flux barrier holes 13, which are adjacent to each other, to an external diameter of each flux barrier hole 13 is less than 3.

Moreover, in this embodiment, a cross-sectional area of each flux barrier hole 13 is less than a cross-sectional area of each rotor bar 30, but the present disclosure is not limited thereto. In some embodiments, the cross-sectional area of each flux barrier hole may larger than the cross-sectional area of each rotor bar or a cross-sectional area of each rotor slot.

In this or some embodiments, these flux barrier holes 13 are filled with metal material, such as gold or aluminum, for increasing magnetic resistance. However, the present disclosure is not limited to the material inside the flux barrier holes 13, and the metal material filled in the flux barrier holes 13 is optional. In principle, the magnetic permeability of each flux barrier hole 13 is only required to be lower than the magnetic permeability of the rotor core 10a. In some embodiments, the flux barrier holes 13 may be empty.

Then, as shown in FIG. 3, in this embodiment, the rotor core 10a further has a plurality of gas holes 10s, which are located close to the axle hole 11s. In detail, the gas holes 10s are located in an area B, which is defined by an inner edge of the end ring 40. In addition, the gas holes 10s are configured for reducing moment of inertia of the rotor core 10a, or increasing cooling capacity.

Figure 4:
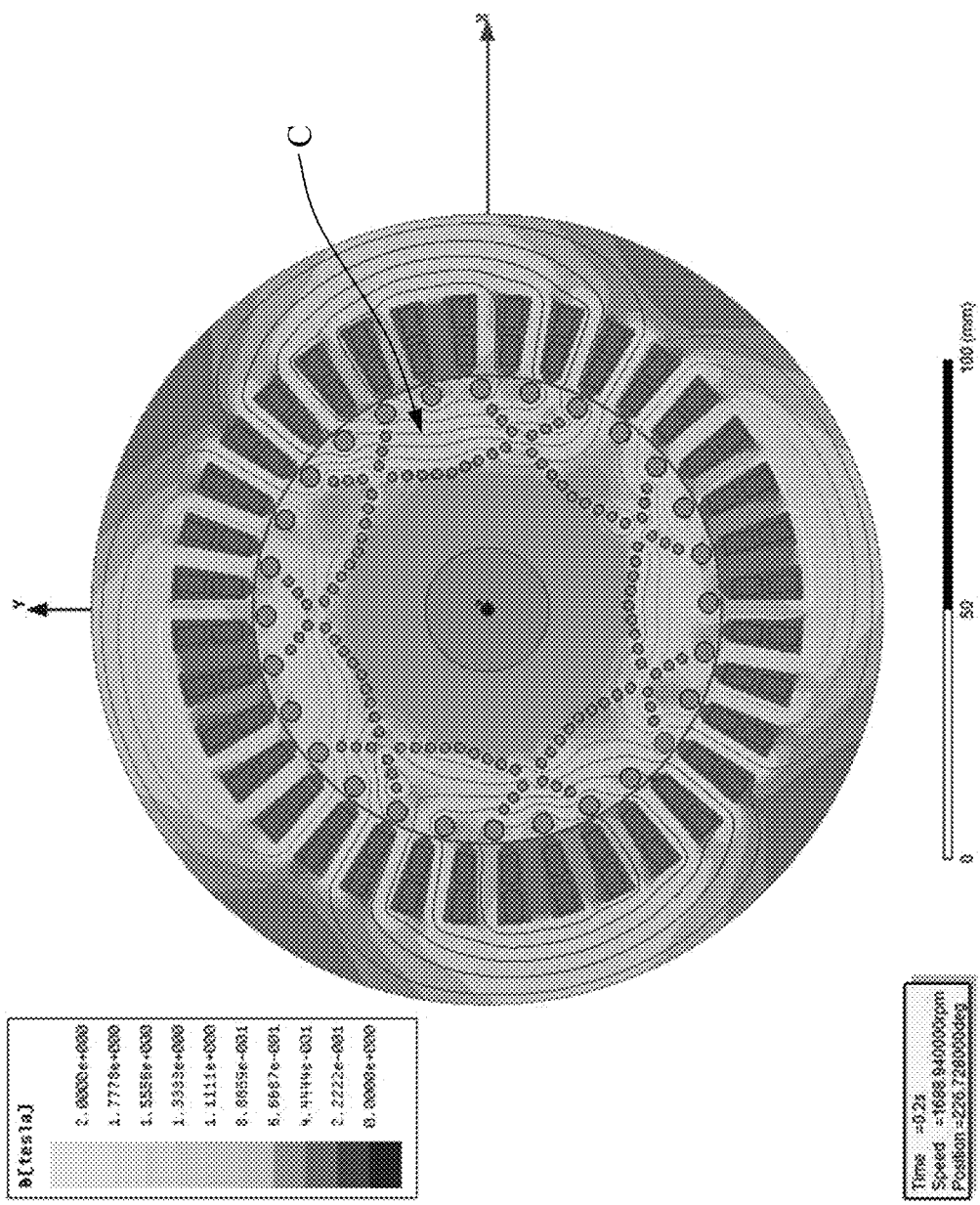
FIG. 4 shows an analysis of the flux density of the electric motor in FIG. 1.

Based on the aforementioned configuration, the rotor mechanism 1a is placed in the stator 2 to complete a basic configuration of the electric motor 9. Since the rotor core 10a has the flux barrier holes 13 arranged along the lines of barriers R1, within a specific time of operation, the arrangement of the flux barrier holes 13 become flux barriers blocking the magnetic lines of force, therefore limiting the range of the magnetic lines of force in the region surrounded by the lines of barriers R1. Therefore, it is favorable for increasing the reluctance torque and the flux density. Please refer to FIG. 4, which shows an analysis of the flux density of the electric motor in FIG. 1. As shown in FIG. 4, within a specific time of operation, the magnetic lines of force passing through the rotor core are crowded in an area C, which is surrounded by the lines of barriers; that is, the magnetic lines of force are crowded between the lines of barriers and the edge of the rotor core, so that the flux density of the area C is increased (as shown in FIG. 4, the value B of the area C ranges between 1.1111e Tesla and 8.8889e Tesla). In addition, according to an experimental result, the flux density in area C is 176.2% higher than the flux density in the same area of a traditional rotor, and the electric motor rotor mechanism of the present disclosure contributes a 15% improvement of torque, so the electric motor rotor mechanism of the present disclosure is favorable for improving the motor performance. Since the adjacent flux barrier holes 13 are spaced apart by a proper distance, as time goes by, a magnetic flux path is formed therebetween to let the magnetic lines of force to pass through even while the motor slip occurs. That is, when the slip between the rotor core 10a and the stator 2 occurs, the magnetic lines of force can pass through the magnetic flux path formed between the adjacent flux barrier holes 13 in order to maintain the operation of the electric motor, thereby reducing the torque ripple of the electric motor.

In brief, by the arrangement of the flux barrier holes 13 on the rotor core 10a, the reluctance torque and the flux density are increased, and the operation is in progress, so that the electric motor 9 is simple in structure, which is for favorable for being smaller, and the flux density is increased to enhance the torque, thereby improving the motor performance. Thus, the electric motor of the present disclosure simultaneously has the advantages of the asynchronous and synchronous electric motors.

In addition, in the rotor mechanism 1a, there is no need to be equipped with magnets, thus there is no cost for magnets as the permanent magnet assisted reluctance synchronous electric motor is magnet-less, therefore there is never the problem of magnets losing their magnetism when heated. In contrast, the rotor mechanism of the present disclosure has high loading and a relatively wide range of usage.

Figure 5:
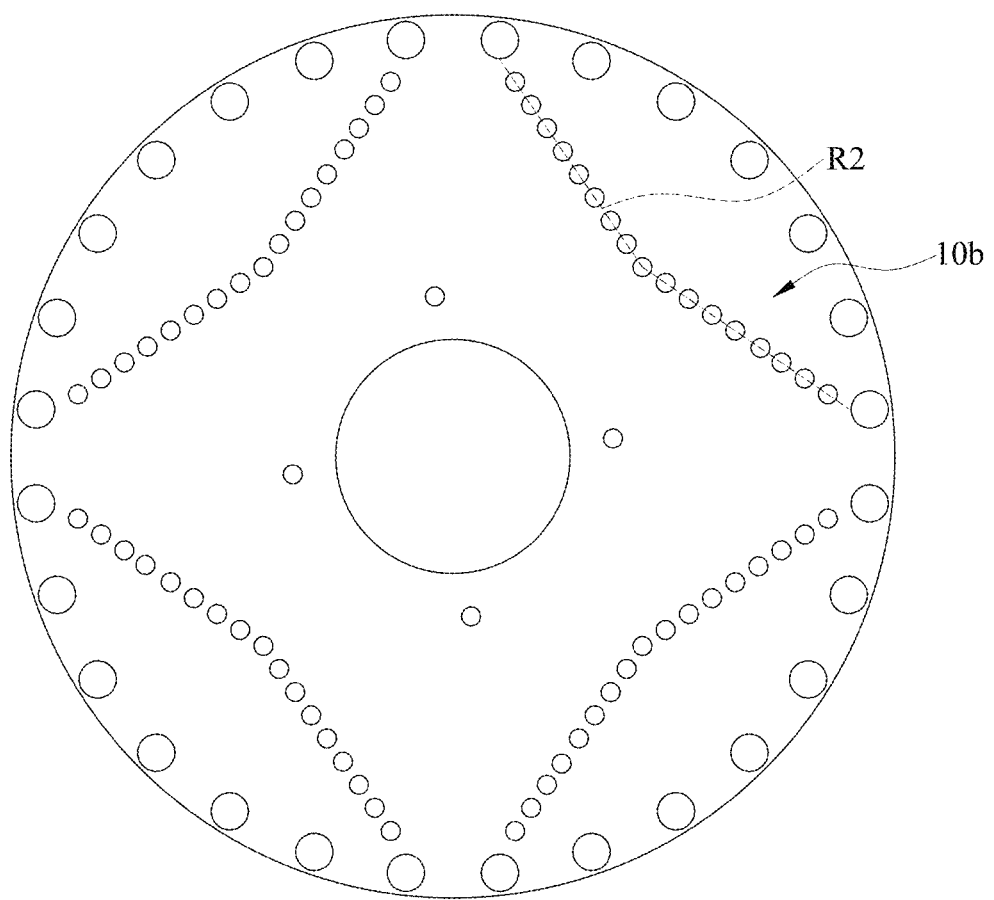
FIG. 5 is a front view of a rotor mechanism according to another embodiment of the disclosure.

Furthermore, although in the aforementioned embodiments, each line of barrier R1 crosses at least another two lines of barriers R1, but the present disclosure is not limited thereto. For example, please refer to FIG. 5, which is a front view of a rotor mechanism according to another embodiment of the disclosure. In this embodiment, a rotor mechanism 1b is provided, and the rotor mechanism 1b has a rotor core 10b having lines of barriers R2. The lines of barriers R2 do not cross one another. It is understood that the number of the lines of barriers R1 can be altered according to actual requirements, the present disclosure is not limited thereto.

Figure 6:
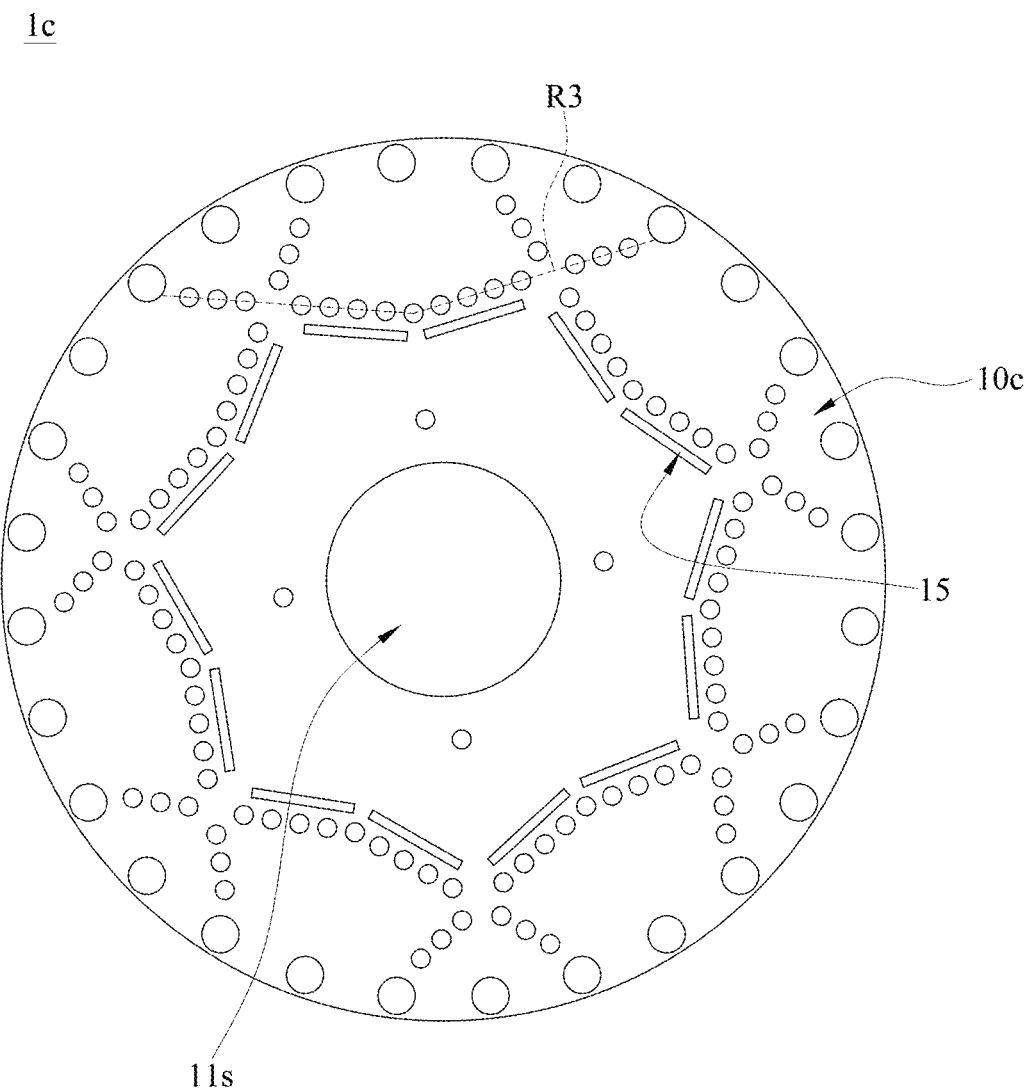
FIG. 6 is a front view of a rotor mechanism according to yet another embodiment of the present disclosure.

Then, please refer to FIG. 6. FIG. 6 is a front view of a rotor mechanism according to yet another embodiment of the present disclosure. In this embodiment, a rotor mechanism 1c is provided, and the rotor mechanism 1c has a rotor core 10c further having a plurality of secondary flux barriers 15. The secondary flux barriers 15 are located between the lines of barriers R3 and the axle hole 11s, and the shape of each secondary flux barrier 15 corresponds to the line of barrier R3 so as to form multiple flux barriers for increasing the flux density. In addition, in this embodiment, each secondary flux barrier 15 is a slot, but the present disclosure is not limited thereto. In some embodiments, each secondary flux barrier may be formed by the arrangement of the flux barrier holes 13 provided in the first embodiment.

Figure 7:
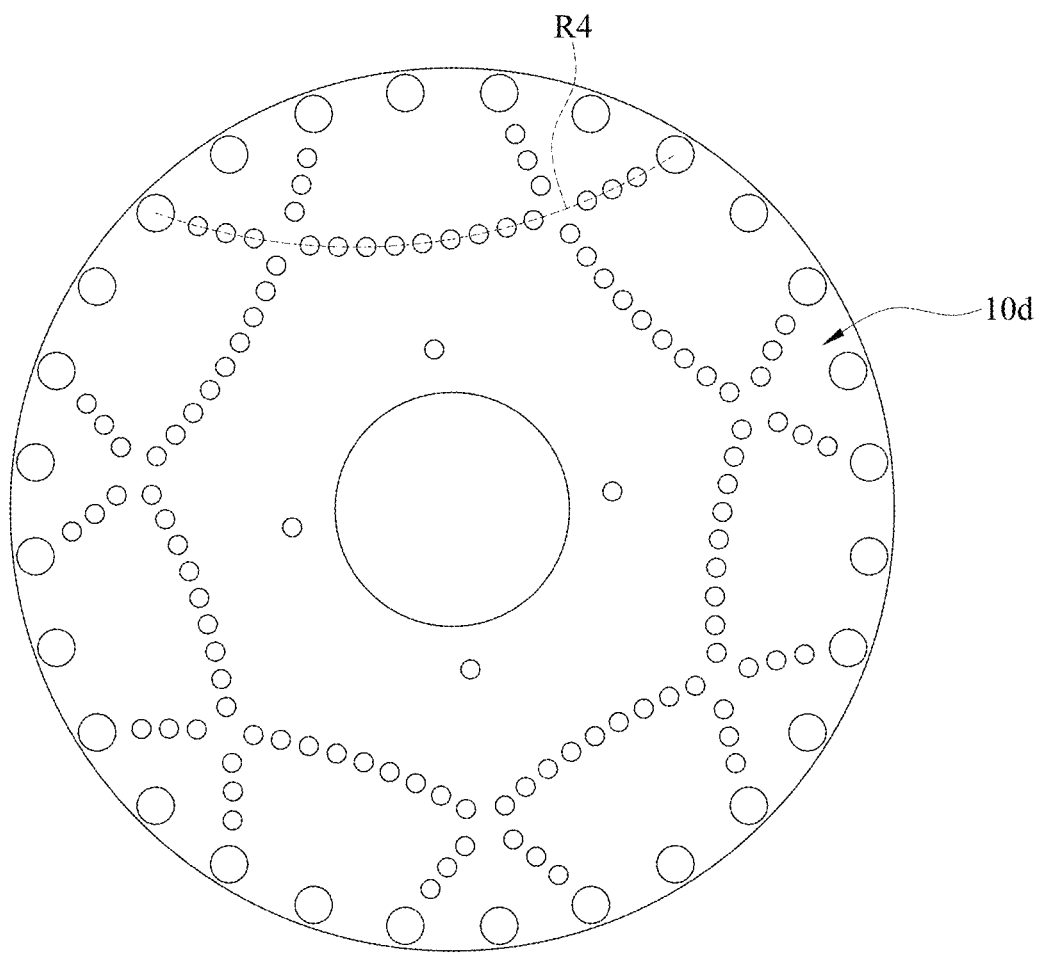
FIG. 7 is a front view of a rotor mechanism according to yet still another embodiment of the present disclosure.

Although each line of barrier in the aforementioned embodiments is a line with a turning point, but the present disclosure is not limited thereto. Please refer to FIG. 7. FIG. 7 is a front view of a rotor mechanism according to yet still another embodiment of the present disclosure. In this embodiment, a rotor mechanism 1d is provided, and each line of barrier R4 of a rotor core 10d of the rotor mechanism 1d is a curved line without turning point. According to the changes among the aforementioned embodiments, in other embodiments, each line of barrier may be a straight line (the curvature is zero) or a curved line having at least two curvatures according to actual requirements, but the present disclosure is not limited thereto.

The rotor mechanism as discussed above simultaneously has the advantages of the synchronous and the asynchronous electric motors, including self-starting capability, the capability to increase the reluctance torque and the flux density, small in size, low in cost, capability to improve the motor performance, and high-loading, to make the rotor mechanism of the present disclosure to become a new topic and a new type of electric motor.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An electric motor rotor mechanism, comprising:
a plurality of rotor bars; and
a rotor core, the plurality of rotor bars being disposed on the rotor core, the rotor core having a plurality of lines of barriers and a plurality of flux barrier holes, each of the plurality of lines of barriers extending from one of the plurality of the rotor bars to another one of the plurality of the rotor bars, the plurality of flux barrier holes being arranged along the plurality of lines of barriers;
wherein on each of the plurality of lines of barriers, the plurality of flux barrier holes are separated from each other;
wherein none of the plurality of flux barriers is radially arranged relative to another one of the plurality of flux barriers; and
wherein each of the plurality of flux barrier holes is a magnetic flux barrier, and an area between each adjacent flux barrier hole in the plurality of flux barrier holes is a magnetic flux path.

2. The electric motor rotor mechanism according to claim 1, wherein a ratio of a distance between two of the plurality of flux barrier holes, that are adjacent to each other, to an external diameter of each of the plurality of flux barrier holes is less than 3.

3. The electric motor rotor mechanism according to claim 1, wherein the plurality of flux barrier holes on each of the plurality of lines of barriers are spaced apart equally.

4. The electric motor rotor mechanism according to claim 1, wherein at least parts of the plurality of flux barrier holes on each of the plurality of lines of barriers are not spaced apart equally.

5. The electric motor rotor mechanism according to claim 1, wherein each of the plurality of flux barrier holes is filled with a material having a magnetic permeability lower than a magnetic permeability of the rotor core.

6. The electric motor rotor mechanism according to claim 1, wherein the plurality of lines of barriers do not cross one another.

7. The electric motor rotor mechanism according to claim 1, wherein each of the plurality of lines of barriers crosses at least another two of the plurality of lines of barriers.

8. The electric motor rotor mechanism according to claim 1, wherein each of the plurality of lines of barriers is a curved line.

9. The electric motor rotor mechanism according to claim 1, wherein a curvature of each of the plurality of lines of barriers is zero.

10. The electric motor rotor mechanism according to claim 1, further comprising two end rings, respectively disposed on two surfaces of the rotor core, which are opposite to each other, each of the plurality of lines of barriers partially overlapping with an orthogonal projection of one of the end rings onto one of the surfaces of the rotor core.

11. The electric motor rotor mechanism according to claim 1, wherein the rotor core further has an axle hole and a plurality of gas holes, and the axle hole is surrounded by the plurality of gas holes.

12. The electric motor rotor mechanism according to claim 10, wherein the rotor core further has a plurality of gas holes located in an area defined by an inner edge of one of the end rings.

* * * * *